United States Patent [19]

Kando et al.

[11] Patent Number: 4,522,478

[45] Date of Patent: Jun. 11, 1985

[54] COVER-EQUIPPED CAMERA

[75] Inventors: Toru Kando; Keisuke Haraguchi, both of Tokyo, Japan

[73] Assignee: Asahi Kogaku Kogyo Kabushiki Kaisha, Tokyo, Japan

[21] Appl. No.: 462,238

[22] Filed: Jan. 31, 1983

[30] Foreign Application Priority Data

Apr. 23, 1982 [JP] Japan .......................... 57-53430[U]

[51] Int. Cl.³ ...................... G03B 17/04; G03B 17/02
[52] U.S. Cl. .................................................. 354/288
[58] Field of Search ...................... 354/187, 202, 288

[56] References Cited

U.S. PATENT DOCUMENTS

| 3,680,455 | 8/1972 | Meinunger | 354/187 |
| 3,864,705 | 2/1975 | Winkler | 354/187 |
| 4,072,970 | 2/1978 | Winkler | 354/187 |

Primary Examiner—L. T. Hix
Assistant Examiner—Della J. Rutledge
Attorney, Agent, or Firm—Browdy and Neimark

[57] ABSTRACT

A cover-equipped camera includes a cover movable right and view left at the front of a camera body to shield or expose its lens and finder, and a fixed cover with and from which the movable cover is contacted or released. The opening and closing cover includes a sliding guide member integral to the cover, and sliders projected from the camera body. The movable cover is guided and slided with the sliders fitted into slits formed in the sliding guide member. When the movable cover is to be opened for exposure, a lock lever is released by the action of an operating lever to quickly open the movable cover. The movable cover is also kept open by magnetic force at the same time. The cover-equipped camera can achieve protection and dust-free effects, is excellent in quick shuttering capacity, and can take photos without failure.

6 Claims, 5 Drawing Figures

COVER-EQUIPPED CAMERA

FIELD OF THE INVENTION

The present invention relates to a cover-equipped camera and, more particularly, to a cover-equipped camera provided with a lock system for locking the cover which is arranged to move right and left at the front of a camera body.

BACKGROUND OF THE INVENTION

Cameras are usually provided with a protection case covering the whole of the camera to protect and make dust-free their lens and view finder, but compact cameras using no protection case have become popular these days. These compact cameras, however, need something like the protection case to protect and make dust-free their lens and view finder when they are carried. There has been thus developed a camera having a cover arranged on a camera body to cover its lens and view finder which moves right and left at the front of said camera body. The cover-equipped camera of this type, however, has a possible disadvantage of taking poor pictures if the cover is not fully open. That is, means should be provided to assure that the cover is completely opened and not shielding the lens and view finder at photo-taking time. Namely, the cover-equipped camera of this type has no means for locking the cover open, though the cover can be opened to expose the lens and view finder. It sometime happens therefore that the cover is carelessly pushed by fingers to partially shield the lens and view finder, thus making photos taken useless. This causes the camera featuring compactness and easy-handling not to achieve its quick shuttering ability and other functions to a maximum extent.

SUMMARY OF THE INVENTION

The present invention is intended to eliminate the drawback and the object of the present invention is therefore to provide a cover-equipped camera having a cover automatically opened when a lever is lightly pushed by finger tips, and a locking means for locking the opened cover not to unintendedly shield the lens and range finder.

BRIEF DESCRIPTION OF THE DRAWING

In the accompanying drawings in which the same reference numerals designate the same parts in all views.

DETAILED DESCRIPTION OF PREFERRED EMBODIMENTS

Figure 1:
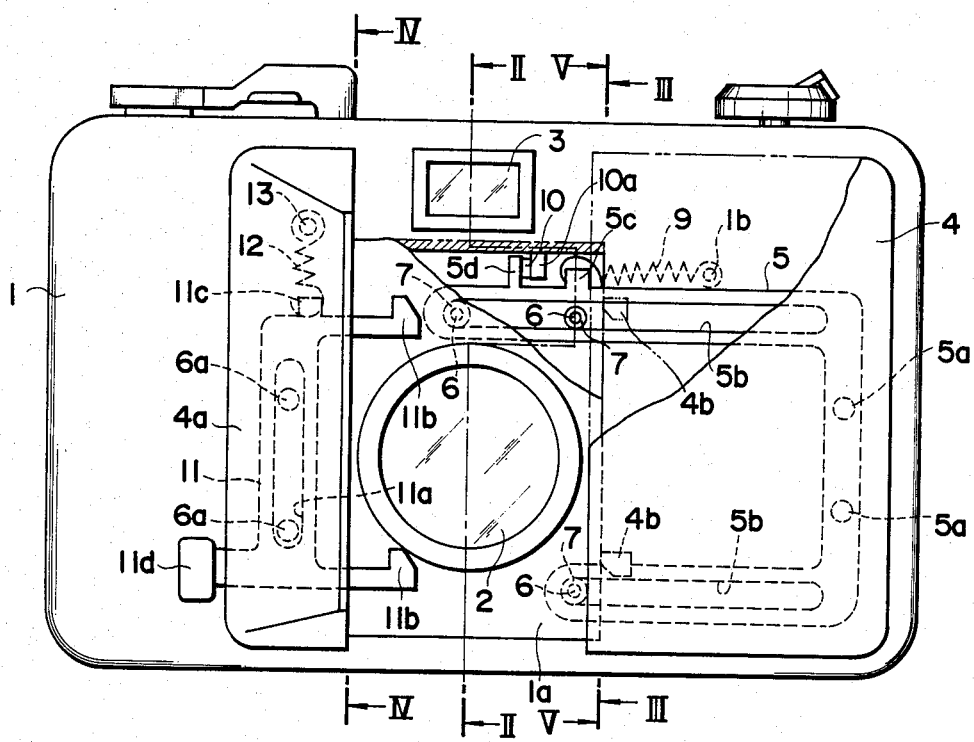
FIG. 1 is a front view showing the preferred embodiment with some parts partly broken away and some shown in phantom lines.
Figure 2:
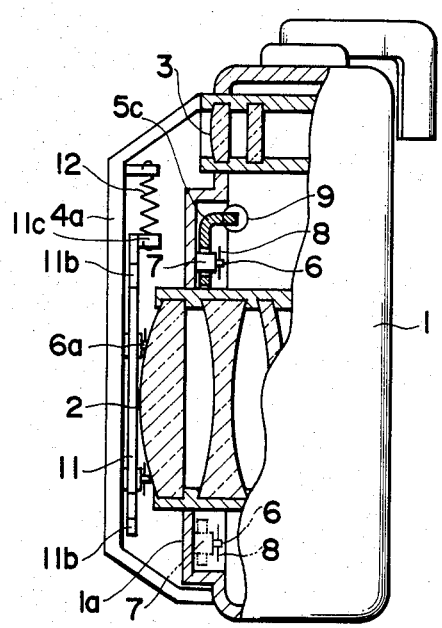
FIG. 2 is a sectional view taken along a line II—II in FIG. 1.
Figure 3:
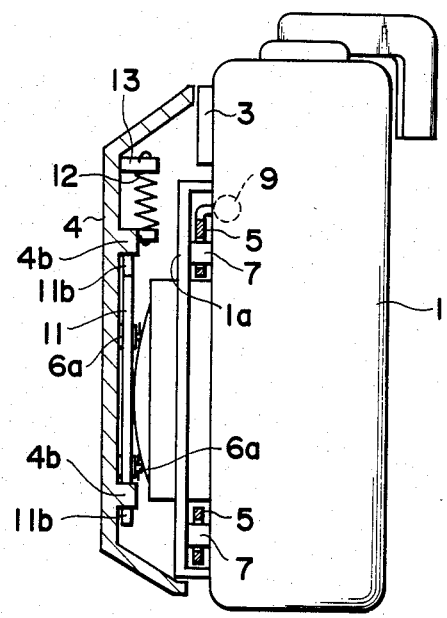
FIG. 3 is a sectional view taken along a line III—III in FIG. 1.
Figure 4:
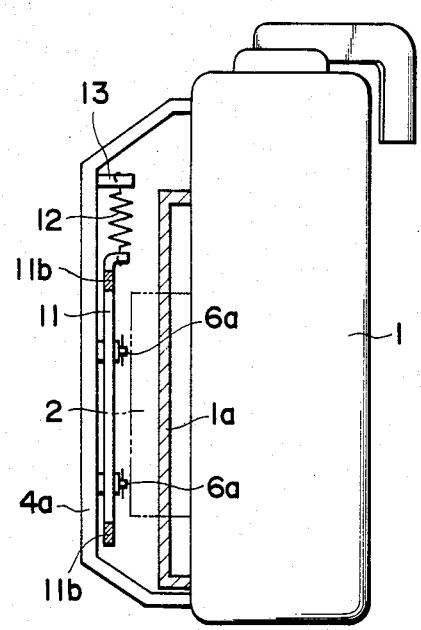
FIG. 4 is a sectional view taken along a line IV—IV in FIG. 1.
Figure 5:
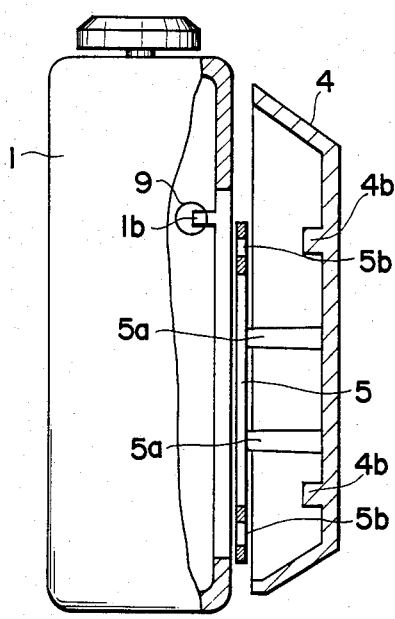
FIG. 5 is a sectional view taken along a line V—V in FIG. 1.

An embodiment of the present invention will be described referring to the accompanying drawings. FIG. 1 is a front view of a cover-equipped camera, in which numeral 1 represents a camera body, 2 a view lens and 3 a finder. Numeral 4 denotes a cover arranged to move right and left at the front of the camera and contact closely with a fixed cover 4a to shield the lens 2 and the finder 3, when closed, so as to achieve protection and dust-free effects, said movable cover 4 being opposed to the fixed cover 4a with the lens 2 interposed between them when opened.

The cover 4 has a sliding guide member 5 movable inside and parallel to a front shielding wall 1a of said camera body 1 and fixed to the cover 4 by means of screws 5a. The sliding guide member 5 is a flattened U-shaped plate and has a slit 5b in each of extensions extending parallel to each other. A slider comprising a projection 6 projecting from the front shielding wall 1a of said camera body 1 and a collar 7 fitted around the projection 6 is engaged with each of the slits 5b and further includes a stopping member 8 attached to the end of said projection 6 so as to prevent projection 6 from coming out of the slit 5b. An erected engaging portion 5c is formed on the upper extension of said sliding guide member 5 and one end of a coil spring 9 is attached to the erected engaging portion 5c while the other end thereof to an engaging projection 1b projected from the front shielding wall 1a. The coil spring 9 urges the sliding guide member 5 toward one side of said camera body 1 to usually keep the cover 4 open and thus the lens 2 and the view finder 3 exposed. A projection 5d is formed near the engaging portion 5c by bending a part of said sliding guide member 5, and a piece of iron 10 is attached to the projection 5d. Opposing to this iron piece 10, a permanent magnet 10a is fixed to the inner face of said front shielding wall 1a. The permanent magnet 10a has such a force as attracts the iron piece 10 to hold the sliding guide member 5 stopped when the sliding guide member 5 forces the cover 4 to the opened position as shown in FIG. 1. The permanent magnet 10a may be attached to the sliding guide member 5. The iron 10 and magnet 10a thus define stopping means to stop the opening motion of the movable cover and to define the opened position thereof.

On the side of the fixed cover 4a opposing to the movable cover 4 with the lens interposed between them, are projections 6a from the outer face of said front shielding wall 1a, each of said projections 6a having a collar similar to that of said projections 6. A lock lever 11 having a slit 11a engageable with the projections 6a is arranged, movable up and down, between the fixed cover 4a and the front shielding wall 1a. The lock lever 11 is a flattened U-shaped plate and has an engaging portion 11b formed at the front end of each of its parallel extensions, another engaging portion 11c erected from its upper end, and an operating lever 11d arranged at its lower end. One end of a coil spring 12 is attached to the engaging portion 11c while the other end thereof to a pin erected from the outer face of said front shielding wall 1a, to thereby urge the lock lever 11 usually upwards. The operating lever 11d is projected outside the fixed cover 4a and freely movable up and down. The engaging portions 11b are engaged with and released from engaging projections 4b on the inner face of said cover 4 to form latches. Each of the engaging projections 4b and 4b has a striking slope corresponding to similar sloped surfaces on each of the engaging portions 11b, so that the operating lever 11 can be automatically lowered enabling the engaging projections 4b to be easily engaged with the engaging portions 11b.

METHOD OF OPERATION

When the cover-equipped camera according to the present invention is used, therefore, the operating lever 11d is pushed downwards, guiding the lock lever 11 downward via the slit 11a and the projections 6a, starting from the condition that the engaging portions 11b are engaged with the engaging projections 4b, namely, the cover 4 is closely contacted with the fixed cover 4a shielding the view lens 2 and the finder 3. When the lock lever 11 is shifted downwards, the engaging portions 11b are released from the engaging projections 4b, respectively. The sliding guide member 5 integral to the cover 4 is thus urged by the action of said coil spring 9 to instantly part from the fixed cover 4a. The sliding guide member 5 can move smoothly through the projections 6 and the slits 5b, and the coil spring 9 must have a force enough to pull the sliding guide member 5 and cover 4. When the cover 4 is pulled and then stopped, the iron piece 10 of said sliding guide member 5 adheres to the permanent magnet 10a arranged on the front shielding wall 1a of said camera body 1, so that the cover 4 can be locked exposing the lens 2 and the view finder 3 ready for photo-taking. The cover 4 can be thus locked in the open position, as shown in FIG. 1, not shielding the lens 2 and view finder 3. The cover will remain locked open and will resist a light push from finger tips. When it is to be closed, the cover 4 is moved toward the fixed cover 4a against the force of said coil spring 9 and permanent magnet 10a. When the cover 4 is closely contacted with the fixed cover 4a, the engaging projections 4b on the inner face of said cover 4 push the engaging portions 11b of said lock lever 11 to slightly move the latter downwards, so that the engaging projections 4b can ride over the engaging portions 11b to make latching engagement with each other. Since the lock lever 11 is usually urged upwards by the action of said coil spring 12, the cover 4 can shield the lens 2 and view finder 3 and keep the camera in the closed protected position, unless the operating lever 11d is pushed downwards to release the latched engagement. When the operating lever 11d is pushed downwards against the force of said coil spring 12, therefore, the cover 4 is instantly opened as already described above.

As is apparent from the above, the present invention provides a cover-equipped camera having a sliding guide member for guiding the cover and a slider arranged at the camera body and engaged with the sliding guide member. Therefore, the cover can move smoothly and lightly. In addition, the cover is usually urged to be open, thus preventing the cover from becoming an obstacle at photo-taking time. The cover-equipped camera according to the present invention further has a lock lever provided with engaging portions for keeping the cover closed. Therefore, opening and closing of said cover can be achieved with mechanical quickness by pushing the operating lever. The cover-equipped camera according to the present invention still further has a pieces of iron and a permanent magnet, so that the cover can be locked open due to magnetic adherence between the iron piece and the permanent magnet, thus eliminating any fear for the cover becoming an obstacle at photo-taking time. Further, the cover-equipped camera according to the present invention enables its lens and hood to be protected and made dust-free, and is excellent in quick shuttering capacity at photo-taking time. Including the case where quick shuttering is intended, the cover-equipped camera according to the present invention makes it unnecessary to assure if the cover is opened or not, and also eliminates any fear that the cover might be carelessly moved leaving photos taken useless.

While the invention has been described in detail above, it is to be understood that this detailed description is by way of example only, and the protection granted is to be limited only within the spirit of the invention and the scope of the following claims.

What is claimed:

1. A cover-equipped camera comprising:
   a camera body including a view finder and a photographic lens;
   a cover consisting of a fixed cover fixed to the camera body and a movable cover adapted to move laterally between a closed position where the view finder and photographic lens is covered by said fixed and movable covers and an opened position where the view finder and the lens are exposed between the fixed and movable covers;
   slider guide member support means projecting from the camera body and a sliding member provided on the movable cover and engaged with said support means to allow said lateral sliding movement of the movable cover, and wherein the sliding guide member is of a flattened U-shaped form and the straight portions of which are laterally run outside the lens, and the slider member support means comprises a collar adapted to be fitted into the flattened portions of the sliding guide member;
   means for constantly urging the movable cover towards the opened position;
   an engaging mechanism adapted to hold the movable cover at the closed position and comprising engaging projection means provided on the movable cover;
   a lock lever arranged on said fixed cover and adapted to engage with the engaging projection means when the movable cover is at the closed position;
   means to constantly bias said lock lever to the engaged position;
   an operating lever adapted to release the engagement between the engaging projection means and the lock lever when shifted against the biasing force; and
   means for stopping the movable cover at the opened position.

2. A cover-equipped camera according to claim 1, wherein said lock lever is biased and shifted vertically.

3. The cover-equipped camera as claimed in claim 1, wherein the stopping means comprises a piece of iron and a cooperating magnet, and one of said piece of iron and said magnet being mounted on the camera body and the other of said piece of iron and said magnet being mounted on said sliding guide member.

4. The cover-equipped camera as claimed in claim 1, wherein the engaging projection means comprises two projections which run outside of the lens when the movable cover is being opened or closed, and the lock lever is of a flattened U-shape the ends of the straight portions of which are each provided with engaging portions to be engaged with the engaging projections, and the flattened portion being formed in the bottom portion of the U-shaped lock lever and being slidably engaged with projections provided on the camera body.

5. The cover-equipped camera as claimed in claim 1, wherein the means for urging the movable cover is a spring attached to the sliding guide member, and the lock lever is biased by a spring attached thereto.

6. The cover-equipped camera according to claim 1, wherein the sliding guide member, the slider guide member support means, and the stopper means are positioned inside of a front shielding wall of the camera body, and the lock lever and the engaging projections are positioned outside of the front shielding wall.

* * * * *